(12) United States Patent
Christiansen et al.

(10) Patent No.: US 12,477,982 B2
(45) Date of Patent: *Nov. 25, 2025

(54) RESIDUE SPREAD MAPPING

(71) Applicant: AGCO International GmbH, Neuhausen (CH)

(72) Inventors: Martin Peter Christiansen, Randers (DK); Ramon Buchaca Tarragona, Randers (DK); Morten Stigaard Laursen, Randers (DK); Esma Mujkic, Randers (DK)

(73) Assignee: AGCO International GmbH, Neuhausen (CH)

( * ) Notice: Subject to any disclaimer, the term of this patent is extended or adjusted under 35 U.S.C. 154(b) by 773 days.

This patent is subject to a terminal disclaimer.

(21) Appl. No.: 17/806,048

(22) Filed: Jun. 8, 2022

(65) Prior Publication Data

US 2022/0394923 A1 Dec. 15, 2022

(30) Foreign Application Priority Data

Jun. 9, 2021 (GB) .................................. 2108227

(51) Int. Cl.
*A01D 41/127* (2006.01)
*A01B 79/00* (2006.01)
*A01D 41/12* (2006.01)

(52) U.S. Cl.
CPC ........ *A01D 41/1243* (2013.01); *A01B 79/005* (2013.01); *A01D 41/127* (2013.01)

(58) Field of Classification Search
CPC .............. A01B 79/005; A01D 41/1243; A01D 41/127; A01F 12/40; A01F 29/12
See application file for complete search history.

(56) References Cited

U.S. PATENT DOCUMENTS

| 5,569,081 | A | 10/1996 | Baumgarten et al. |
| 9,668,418 | B2 | 6/2017 | Patton et al. |
| 10,470,365 | B2 | 11/2019 | Mahieu et al. |

(Continued)

FOREIGN PATENT DOCUMENTS

| EP | 1790207 A1 | 5/2007 |
| EP | 3298880 A1 | 3/2018 |

(Continued)

OTHER PUBLICATIONS

UK Intellectual Property Office, Search report for UK Priority Application No. GB2108227.6, dated Mar. 3, 2022.

*Primary Examiner* — Matthew J. Reda

(57) ABSTRACT

Methods and systems for mapping the distribution of residue material in an environment in which one or more agricultural machines are operable. A sensing arrangement including one or more sensors mounted or otherwise coupled to an agricultural machine operating within the environment is used to obtain sensor data indicative of residue material spread by a spreader tool of the machine. A local distribution of material associated with the spreader tool is determined and used to update a map of a global distribution of the material across the environment. The map of the global distribution comprises one or more sub-regions categorized based on the local distribution dependent on material characteristics at those sub-regions.

17 Claims, 3 Drawing Sheets

(56) References Cited

U.S. PATENT DOCUMENTS

| | | | |
|---|---|---|---|
| 11,758,844 B2* | 9/2023 | White | A01D 41/127 |
| | | | 701/50 |
| 11,889,787 B2* | 2/2024 | Vandike | A01D 41/141 |
| 2011/0270495 A1 | 11/2011 | Knapp | |
| 2017/0086373 A1 | 3/2017 | Mahieu et al. | |
| 2018/0310474 A1* | 11/2018 | Posselius | A01D 41/127 |
| 2018/0338422 A1* | 11/2018 | Brubaker | A01D 41/1208 |
| 2020/0008350 A1* | 1/2020 | Borsdorf | A01D 61/02 |
| 2020/0107490 A1* | 4/2020 | Zemenchik | A01B 63/111 |
| 2020/0120869 A1 | 4/2020 | Vandike et al. | |
| 2021/0034867 A1* | 2/2021 | Ferrari | G05D 1/0236 |
| 2022/0397417 A1* | 12/2022 | Christiansen | A01D 41/1243 |

FOREIGN PATENT DOCUMENTS

| | | |
|---|---|---|
| EP | 3494773 A1 | 6/2019 |
| WO | 2018/162699 A1 | 9/2018 |

\* cited by examiner

RESIDUE SPREAD MAPPING

TECHNICAL FIELD

The present invention relates, in general, to systems and methods for monitoring residue spread from a harvesting machine.

BACKGROUND

Agricultural combines work to cut crop material from a field before separating the grain from the material other than grain (MOG) (referred to interchangeably as "residue") on board. Generally, the grain is transferred to a grain bin of the combine (where it may be temporarily stored) and the MOG is deposited back onto the field. A second operation may be performed to gather the deposited MOG, or the MOG may be used as a fertiliser for the soil in the field. In either case, it is important for the MOG to be distributed evenly during deposition, in order to ensure an efficient second harvesting operation (e.g. bailing of the MOG) or to ensure effective fertilisation of the soil. When residue is unevenly distributed over a field, not only are exposed areas at risk for erosion, but inconsistencies in soil temperatures and moisture also may cause uneven plant emergence the following year, hurting yield. Ideally, residue should be spread consistently and managed to promote uniform rapid warming and drying in the spring for earlier planting and sufficient seed germination. It is also important not to spread MOG or residue into standing crop adjacent to the machine—i.e. the crop to be harvested on the next pass by the machine—as spreading into standing crop may result in the same area being spread twice causing an unwanted built of residue in a given area, again leading to uniformity issues.

It is an aim to improve upon known systems such that the distribution of material from an agricultural machine can be monitored and optionally corrected more effectively and efficiently.

SUMMARY OF THE INVENTION

In an aspect of the invention there is provided a system for mapping the distribution of residue material in an environment in which one or more agricultural machines are operable, the system comprising: a sensing arrangement comprising one or more sensors mounted or otherwise coupled to an agricultural machine operating within the environment; and one or more controllers, configured to: receive sensor data from the one or more sensors indicative of residue material spread by a spreader tool of the agricultural machine; determine, from the sensor data, a local distribution of residue material associated with the spreader tool; and update a map of a global distribution of residue material across the environment in dependence on the local material distribution determined from the sensor data and the location of the agricultural machine, wherein updating the map of the global distribution comprises categorising one or more sub-regions within the environment in dependence on the determined local distribution.

Advantageously, the present invention provides means to map the distribution of material across an environment such that appropriate actions can be taken in dependence thereon. This may include appropriate corrective actions and/or adjusting control of a follow up agricultural operation (e.g. baling or the like) to account for the distribution of residue in the environment.

When used herein and throughout the specification the term "global distribution" is intended to cover the distribution of material across the mapped environment. This may be one or more harvested/harvestable fields, for example.

The one or more sub-regions may comprise a bounding box about a region within the mapped environment assigned with a particular category. This may be termed a "polygonal" or "regional" mapping approach. Updating the map may include one or more of: generating a new sub-region within the mapped environment; reassigning a particular sub-region to a different category; and/or changing the size and/or shape of the sub-region within the mapped environment, for example where the local distribution is indicative of a change in residue distribution within the sub-region or within the area immediately adjacent to the sub-region such that the sub-region may effectively be extended to encompass such an area.

Categorising may comprise assigning one of a plurality of categories to a sub-region of the environment in dependence on the determined local distribution at the location of the particular sub-region. The plurality of categories may include:

a region corresponding to unharvested crop;
 a region corresponding to harvested crop and where residue material has been spread;
 a region corresponding to standing crop (i.e. unharvested crop) but where material has been spread into, for example as the agricultural machine passed along an adjacent row in the environment; and/or
 a region corresponding to an area of harvested where residue material has been spread more than once, for example as the agricultural machine passes along an adjacent row in the environment.

The system, e.g. the one or more controllers, may be operable to control one or more operating parameters of the agricultural machine or components thereof in dependence on the mapped distribution. For example, the one or more controllers may be operable to control operating parameters related to the spreading of material from the machine, e.g. of a spreader tool of the machine, to control when material is distributed therefrom. In embodiments, the one or more controllers may be configured to prevent distribution of material as the agricultural machine passes areas of the environment corresponding to sub regions where material has previously been spread into standing crop. This may advantageously prevent overlapping of material spread to prevent or at least reduce areas of significant residue material build up.

In embodiments, the system of the present aspect of the invention may be configured to control operation of a user interface, e.g. a display means, which may provide information, for example to an operator of the agricultural machine corresponding to the mapped distribution. This may comprise providing a graphical representation of the mapped distribution. The graphical representation may comprise raw sensor data, or may preferably comprise a graphical illustration of the sensor data, for example as a two-dimensional map with the categorised sub-region(s) indicated therein. The sub-region(s) may be highlighted using different colours, shades and/or patterns such that they are visually distinct from other regions in the representation of the mapped distribution.

The user interface may comprise a user interface of the agricultural machine, such as a user terminal provided in the machine, e.g. in an operator cab of the machine. The user interface may comprise a display on a remote device, such as a smartphone, tablet computer, computer or the like. The user interface may comprise a user terminal on one or more further machines operating in the environment. For example, the information relating to the mapped distribution may in this manner be provided to an operator of a further machine to inform subsequent agricultural operation.

The sensing arrangement may comprise an image sensor, such as a camera. The sensing arrangement may comprise a transceiver type sensor, having a transmitting component for transmitting a measurement signal and a receiving component for receiving reflected measurement signals. The sensor may comprise a RADAR sensor, LIDAR sensor, infrared sensor, or the like, for example. The sensing arrangement may comprise an ultrasonic sensor. The sensing arrangement may comprise multiple sensors, which may be of the same type or some combination of different sensor types.

The system may include or be communicably coupled to a position module. The position module may be operable to provide information relating to the location of an associated agricultural machine within or with respect to the mapped environment. The positioning module may comprise or be part of a positioning system, such as a Global Navigation Satellite System (GNSS), e.g. GPS, GLONASS, Galileo or the like, and/or a local positioning system for determining the location of the agricultural machine within the environment.

The system may include or be communicably coupled to an inertial measurement unit. The inertial measurement unit may be used to determine an orientation of the agricultural machine within the environment.

The system may comprise a distributed system. For example, one or more components of the system may be located off-board from the agricultural machine. This may include one or more of the controller(s). This may include a storage means having the mapped distribution stored therein. For example, the system may include a remote storage means, such as a remote server housing the mapped distribution, The system may include multiple agricultural machines, each comprising one or more sensors for obtaining sensor data. Each of the multiple agricultural machines may be communicable with a central processing means having the one or more controllers for performing the processing steps of the invention.

In a further aspect of the invention there is provided a control system for mapping the distribution of residue material in an environment in which one or more agricultural machines are operable, the control system comprising one or more controllers, and being configured to: receive sensor data from a sensing arrangement comprising one or more sensors mounted or otherwise coupled to an agricultural machine operating within the environment, the sensor data being indicative of residue material spread by a spreader tool of the agricultural machine; determine, from the sensor data, a local distribution of residue material associated with the spreader tool; and update a map of a global distribution of residue material across the environment in dependence on the local material distribution determined from the sensor data and the location of the agricultural machine, wherein updating the map of the global distribution comprises categorising one or more sub-regions within the environment in dependence on the determined local distribution.

The one or more controllers may collectively comprise an input (e.g. an electronic input) for receiving one or more input signals indicative of the sensor data. The one or more controllers may collectively comprise one or more processors (e.g. electronic processors) operable to execute computer readable instructions for controlling operation of the control system, for example to determine the local distribution and/or update the global distribution. The one or more processors may be operable to generate one or more control signals, for example for controlling output of a graphical representation of the global distribution, or for controlling operation of one or more agricultural machines within the environment. The one or more controllers may collectively comprise an output (e.g. an electronic output) for outputting the one or more control signals.

The one or more controllers of the control system may be configured in any manner of the one or more controllers of the system described hereinabove with reference to the first aspect of the invention.

A further aspect of the invention provides an agricultural machine comprising the system or control system of any preceding aspect of the invention.

In a further aspect of the invention there is provided a method of mapping the distribution of residue material in an environment in which one or more agricultural machines are operable, the method comprising: receiving sensor data from one or more sensors of a sensing arrangement mounted or otherwise coupled to an agricultural machine operating within the environment, the sensor data being indicative of residue material spread by a spreader tool of the agricultural machine; determining, from the sensor data, a local distribution of residue material associated with the spreader tool; and updating a map of a global distribution of residue material across the environment in dependence on the local material distribution determined from the sensor data and the location of the agricultural machine, wherein updating the map of the global distribution comprises categorising one or more sub-regions within the environment in dependence on the determined local distribution.

The one or more sub-regions may comprise a bounding box about a region within the mapped environment assigned with a particular category. This may be termed a "polygonal" or "regional" mapping approach. Updating the map may include one or more of: generating a new sub-region within the mapped environment; reassigning a particular sub-region to a different category; and/or changing the size and/or shape of the sub-region within the mapped environment, for example where the local distribution is indicative of a change in residue distribution within the sub-region or within the area immediately adjacent to the sub-region such that the sub-region may effectively be extended to encompass such an area.

Categorising may comprise assigning one of a plurality of categories to a sub-region of the environment in dependence on the determined local distribution at the location of the particular sub-region. The plurality of categories may include:
- a region corresponding to unharvested crop;
- a region corresponding to harvested crop and where residue material has been spread;
- a region corresponding to standing crop (i.e. unharvested crop) but where material has been spread into, for example as the agricultural machine passed along an adjacent row in the environment; and/or
- a region corresponding to an area of harvested where residue material has been spread more than once, for example as the agricultural machine passes along an adjacent row in the environment.

The method may comprise controlling one or more operating parameters of the agricultural machine or components thereof in dependence on the mapped distribution. For example, the method may comprise controlling one or more operating parameters related to the spreading of material from the machine, e.g. of a spreader tool of the machine, to control when material is distributed therefrom. In embodiments, the method may comprise preventing distribution of material as the agricultural machine passes areas of the environment corresponding to sub regions where material has previously been spread into standing crop. This may advantageously prevent overlapping of material spread to prevent or at least reduce areas of significant residue material build up.

In embodiments, the method may comprise controlling operation of a user interface, e.g. a display means, to provide information, for example to an operator of the agricultural machine corresponding to the mapped global distribution. This may comprise providing a graphical representation of the mapped distribution. The graphical representation may comprise raw sensor data, or may preferably comprise a graphical illustration of the sensor data, for example as a two-dimensional map with the categorised sub-region(s) indicated therein. The sub-region(s) may be highlighted using different colours, shades and/or patterns such that they are visually distinct from other regions in the representation of the mapped distribution.

The user interface may comprise a user interface of the agricultural machine, such as a user terminal provided in the machine, e.g. in an operator cab of the machine. The user interface may comprise a display on a remote device, such as a smartphone, tablet computer, computer or the like. The user interface may comprise a user terminal on one or more further machines operating in the environment. For example, the information relating to the mapped distribution may in this manner be provided to an operator of a further machine to inform subsequent agricultural operation.

The method may comprise obtaining information relating to the location of an associated agricultural machine within or with respect to the mapped environment. The method may comprise updating the mapped global distribution in dependence on the location of the agricultural machine.

The method may comprise determining an orientation of the agricultural machine within the environment.

The method may be performable utilising a distributed system. For example, one or more components of the system may be located off-board from the agricultural machine. This may include a storage means having the mapped distribution stored therein. For example, the system may include a remote storage means, such as a remote server housing the mapped distribution.

There may be multiple agricultural machines, each comprising one or more sensors for obtaining sensor data. Each of the multiple agricultural machines may be communicable with a central processing means having the one or more controllers for performing the processing steps of the invention.

In a further aspect of the invention there is provided computer software comprising computer readable instructions which, when executed by one or more processors, causes performance of the method of the preceding aspect of the invention.

A further aspect of the invention provides a computer readable storage medium comprising the computer software of the preceding aspect of the invention. Optionally, the storage medium comprises a non-transitory computer readable storage medium.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
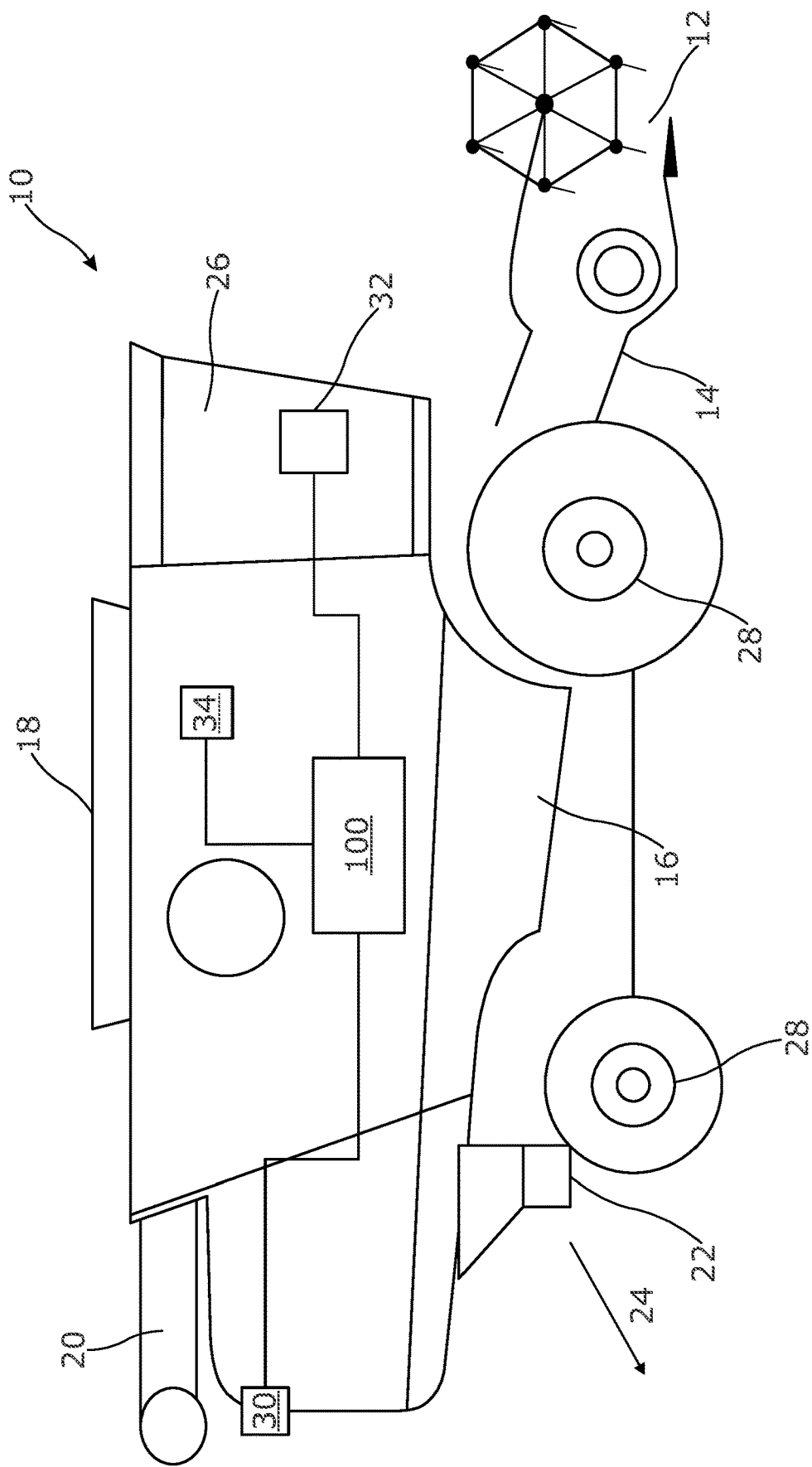
FIG. 1 is a schematic side cross-sectional view of an agricultural harvester embodying aspects of the invention.

FIG. 1 illustrates an agricultural machine, and specifically a combine 10, embodying aspects of the present invention. The combine 10 is coupled to a header 12 which is operable, in use, to cut and gather a strip of crop material as the combine 10 is driven across a field/area to be harvested during a harvesting operation. A conveyor section 14 conveys the cut crop material from the header 12 into a crop processing apparatus 16 operable to separate grain and non-grain (i.e. material other than grain (MOG)) as will be appreciated. It is noted here that apparatus for separating grain and non-grain material are well-known in the art and the present invention is not limited in this sense. The skilled person will appreciate that numerous different configurations for the crop processing apparatus may be used as appropriate. Clean grain separated from the cut crop material is collected in a grain bin 18, which may be periodically emptied, e.g. into a collection vehicle, storage container, etc. utilising unloading auger 20. The remaining non-grain material (MOG)/residue is separately moved to a spreader tool 22 which is operable in use to eject the non-grain material or MOG from the rear of the combine 10 and onto the ground. In FIG. 1, this is represented by arrow 24 which illustrates the MOG being ejected rearwards from the combine 10. It will be appreciated that in some embodiments the combine 10 may also include a chopper tool positioned, for example, between the crop processing apparatus 16 and the spreader tool 22 and operable, in use, to cut the MOG/residue before it is spread by the spreader tool 22.

The combine 10 also typically includes, amongst other features, an operator cab 26, wheels 28, engine (not shown) and a user interface 32.

As will be discussed in detail herein, the combine 10 additionally includes a sensor 30 mounted to the rear of the combine 10 and having a sensing region rearwards of the combine 10 covering the area in which residue material is spread by the spreader tool 22. The sensor in the illustrated embodiment comprises a camera, although other types of imaging sensor may be used, and/or use of a transceiver type sensor is also envisaged, such as a LIDAR, RADAR or ultrasonic sensor, for example. The sensor 30 is sued, by a control system 100 of the combine 10 to determine one or more characteristics of a distribution of material associated with the spreader tool 22, hereinafter referred to as a local distribution. This can include the position of residue material relative to the combine 10, and/or a measure of an amount of material spread by the spreader tool 22 and the location of that material within the environment. As discussed herein, the local distribution determined using sensor 30 is used to update a map of a global distribution of residue material across the environment as a whole.

Figure 2:
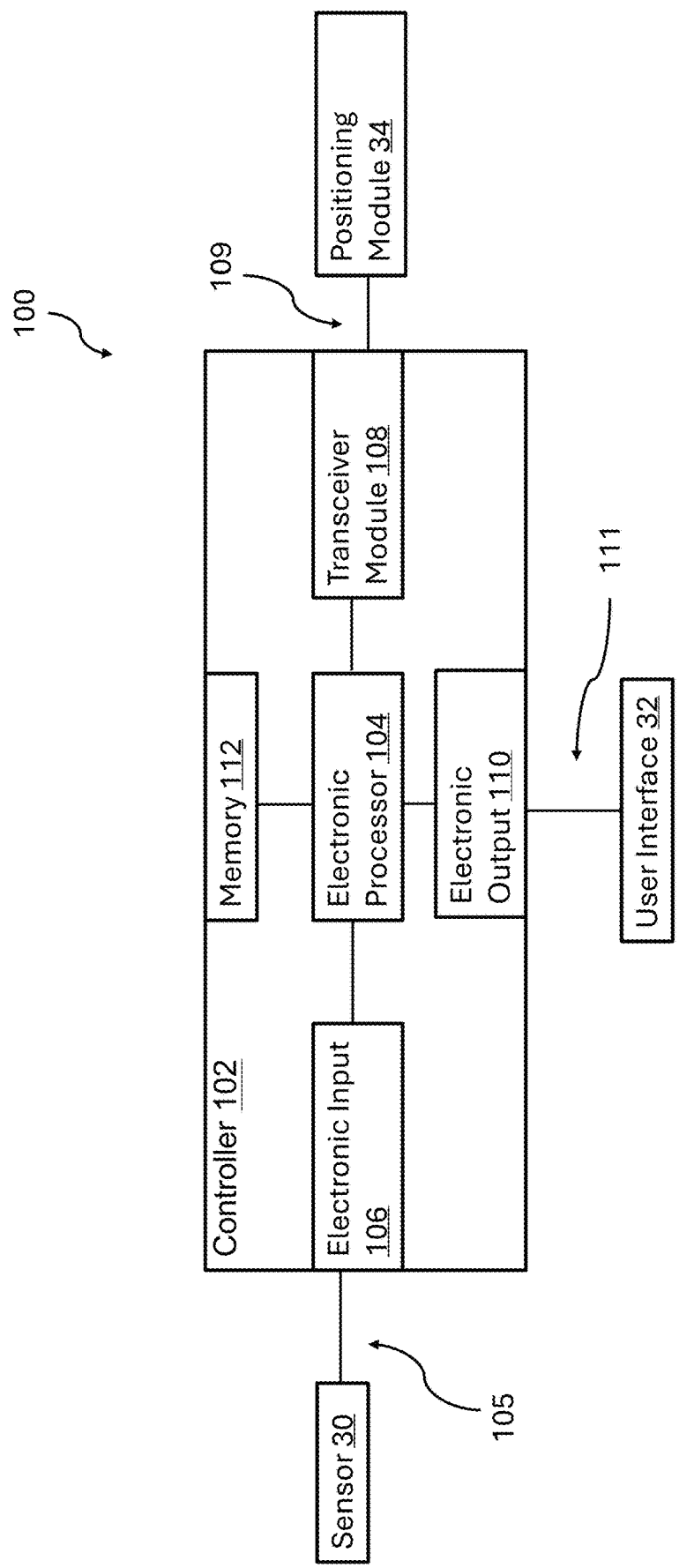
FIG. 2 is a schematic view of an embodiment of a control system of the invention.

FIG. 2 illustrates the control system 100 further. As shown, control system 100 comprises a controller 102 having an electronic processor 104, an electronic input 106 and electronic output 110 and transceiver module 108. The processor 104 is operable to access a memory 112 of the controller 102 and execute instructions stored therein to perform the steps and functionality of the present invention discussed herein, e.g. by controlling the user interface 32, to provide a representation to an operator of the combine 10 illustrative of the determined global residue material distribution.

The processor 104 is operable to receive sensor data via input 106 which, in the illustrated embodiment, takes the form of input signals 105 received from the sensor 30. Utilising this data, the processor 104 is configured to analyse the data and extract therefrom a measure of a local material distribution associated with the spreader tool 22. In practice, this may involve determining a measure of an amount of residue material being spread in a central measurement region corresponding to the region defined by the width of the combine 10 (or header 12), and/or an amount of residue material being spread left or right of the combine 10, e.g. into adjacent standing crop or into an adjacent crop row, such as the row previously harvested. Analysis of the sensor data to extract the local residue distribution falls outside the scope of the present invention and the invention is not limited in this sense.

The processor 104 is also operably coupled to a positioning module 34. The positioning module 34 forms part of a Global Navigation Satellite System (GNSS) and is operable to provide information relating to the location of the combine 10 within the mapped environment. Utilising the location of the combine 10, the local distribution determined using sensor data from the sensor 30 can be related to a global distribution across the entire environment.

Output 110 is operably coupled to the user interface 32 of the combine 10. Here, the control system 100 is operable to control operation of the user interface 32, e.g. through output of control signals 111 in order to display operational data to an operator of the combine 10 relating to the operation of the control system 100. Specifically, the control system 100 is operable to control the user interface to display to the operator a graphical representation of a map of the global distribution of the MOG across the environment.

Figure 3A:
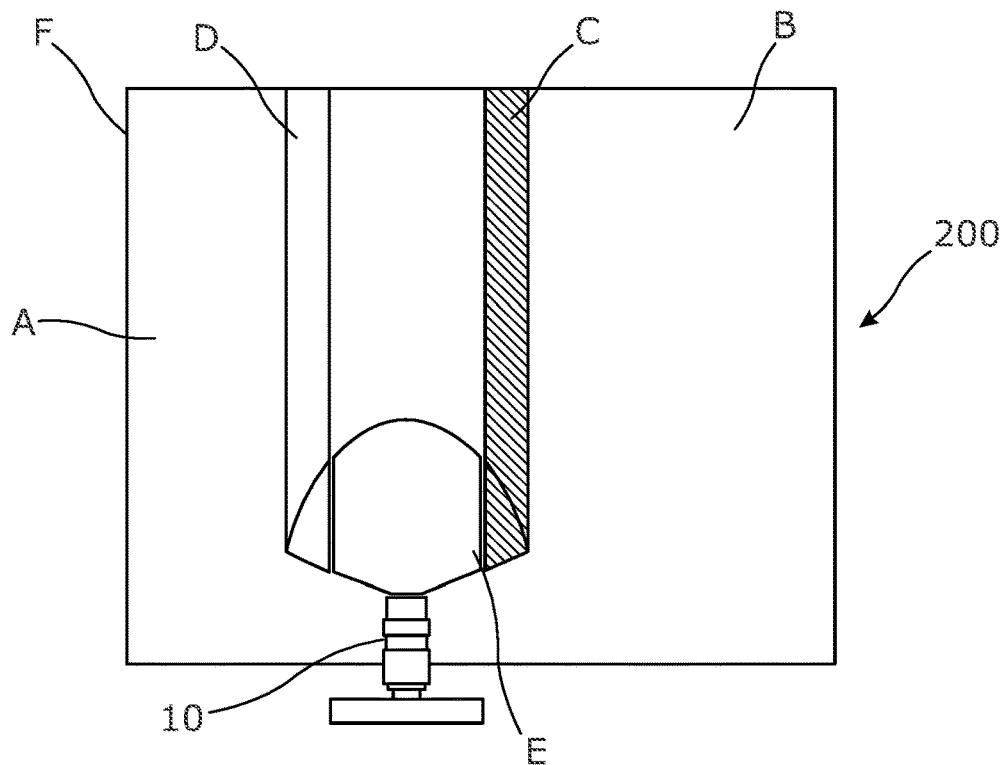
FIGS. 3A & 3B are graphical representations illustrating aspects of the invention.
Figure 3B:
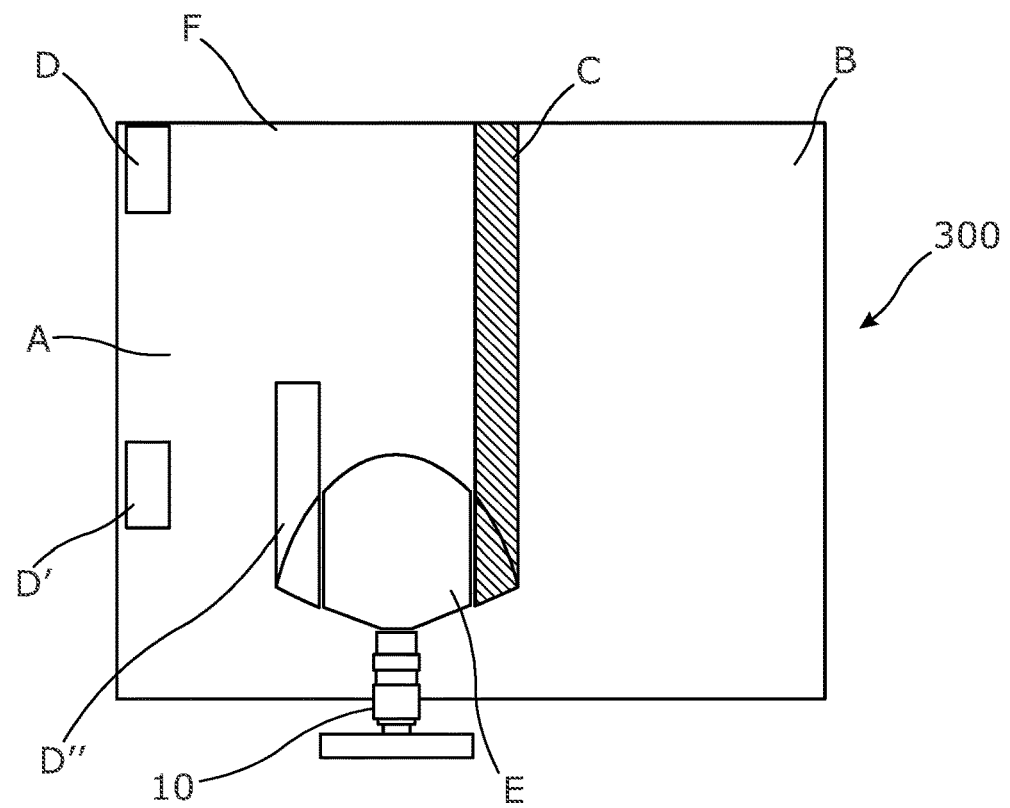

FIGS. 3A and 3B illustrate the operational use of the invention further.

Specifically, FIGS. 3A and 3B show representations 200, 300 of the mapped global distribution of residue material within an environment, here a field F, formed using the present invention. The representations 200, 300 may be shown as an image on a user interface, e.g. display 32 in the operator cab of the combine 10.

The representations include multiple different sub-regions which are each classified in dependence on the local material distribution determined in the manner discussed herein, and their position with respect to a representation of the combine 10. The sub-regions A, B, C, D, E are delineated by bounding boxes and as such comprise polygonal sub-regions corresponding to locations in the field F having determined residue spread characteristics. Based on these characteristics the sub-regions are classified and the classifications are used to generate the representations 200, 300 in the manner discussed herein.

Specifically, the categories include:
a region corresponding to unharvested crop, B, which may be the default category assuming that any area where the combine 10 hasn't passed is as yet unharvested;
a region corresponding to harvested crop and where residue material has been spread, A;
a region corresponding to standing crop (i.e. unharvested crop) but where material has been spread into, C, for example as the combine 10 passed along an adjacent row in the environment; and/or
a region corresponding to an area of harvested where residue material has been spread more than once, D, D', D", for example as the combine 10 passes along an adjacent row in the field, F.

As discussed herein, the processor 104 is operable to determine a local residue material distribution. Based on this, and with knowledge of the location of the combine 10 within the field F, as determined via positioning module 34, a determination is made on a measure of residue material being spread into at various locations within the field F. In turn, the processor 104 is configured to categorise locations within the field F based on the currently observed local distribution from the spreader tool 22 and knowledge of the category prior to the combine 10 spreading residue material at the corresponding location within the field F.

In this way, the map of the global residue distribution may be continually updated as the combine 10 traverses the field F. Updating the map may include generating a new sub-region within the mapped environment. This may occur where the local material distribution as determined by the processor 104 is indicative of the spreader tool 22 beginning to spread material into an area which has previously been harvested, e.g. generating a new sub-region categorised as "D". Updating the map may include reassigning a particular sub-region to a different category. Updating the map may include changing the size and/or shape of the sub-region within the mapped environment, for example where the local distribution is indicative of a change in residue distribution within the sub-region or within the area immediately adjacent to the sub-region such that the sub-region may effectively be extended to encompass such an area.

As show, sub-regions within the representations 200, 300 are distinguished from one another using colour and pattern coding. In this manner, a representation 200, 300 is produced which an operator may view and quickly determine areas within the field F where there is potentially significant build-up of residue material. This can be used to inform later harvesting operations, e.g. control over the speed and operation of further machines when operating in those areas, or indeed in some instances to perform a corrective action to make the distribution more uniform in those areas.

For example, in an extension of the illustrated embodiments, the representation 200, 300 may be used to control future harvesting operations by the combine 10 on future passes of the field F. In both representations 200, 300, an area C corresponding to a region where residue material is determined to have been spread into standing crop on the currently illustrated pass of the combine 10. Accordingly, with this knowledge control over the spreader tool 22 may be possible on the next pass to prevent distribution altogether, or at least for the portion of the path of the next path corresponding to sub-region C. This may be an operator performing this task manually whilst viewing the representations 200, 300, or in some other embodiments may include active control over the spreader tool 22 itself. In this way the present invention may provide a means to control distribution on the basis of the determined global distribution to reduce areas of significant residue material build up in the field F.

The representation 200, 300 is displayed here as an overhead map of the field F in which the combine 10 is operating, or has operated, and is presented on the user interface 32 of the combine 10. However, it will be appreciated that the representation may be stored remotely, or be sent over a communication channel, such that it may be viewed on other interfaces, including on a remote device or user terminal of a further machine operating or operable in the field F.

It is noted here that the illustrated embodiments show a control system 100 housed within combine 10. However, it will be appreciated that the control system 100 could be configured as a distributed system, with one or more components housed remotely, e.g. on further agricultural machines operating within the environment, on a remote server or the like. In a presently preferred embodiment, the control system 100 is communicable with a remote server where the global distribution and the map thereof is stored and is accessible to multiple different operators.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

It will be appreciated that the above embodiments are discussed by way of example only. Various changes and modifications can be made without departing from the scope of the present application.

The invention claimed is:

1. A system for mapping the distribution of residue material in an environment in which at least one agricultural machine is operable, the system comprising:
    a sensing arrangement comprising at least one sensor mounted or otherwise coupled to the agricultural machine operating within the environment; and
    at least one controller, configured to:
        receive sensor data from the sensors indicative of the residue material spread by a spreader tool of the agricultural machine;
        determine, from the sensor data, a local distribution of the residue material associated with the spreader tool;
        update a map of a global distribution of the residue material across the environment based on the local distribution determined from the sensor data and a location of the agricultural machine, wherein updating the map comprises: assigning one of a plurality of categories to each of at least one sub-region of the environment based on the determined local distribution at a location of the particular sub-region, wherein the plurality of categories comprise:
            a region corresponding to unharvested crop;
            a region corresponding to harvested crop and where the residue material has been spread;
            a region corresponding to standing crop and where the material has been spread into as the agricultural machine passed along an adjacent row in the environment; and
            a region corresponding to an area of harvested crop where the residue material has been spread more than once as the agricultural machine passes along an adjacent row in the environment; and
        cause the spreader tool of the agricultural machine to modify a distribution rate of the residue material when the agricultural machine travels through areas of the environment corresponding to the sub-regions where residue material has previously been spread.

2. The system of claim 1, wherein each of the sub-regions comprises a bounding box about a region within the mapped environment assigned with the category of the particular sub-region.

3. The system of claim 1, wherein updating the map comprises at least one of the following:
    generating a new sub-region within the mapped environment;
    reassigning a particular sub-region to a different category; and
    changing the size and/or shape of the sub-region within the mapped environment.

4. The system of claim 1, configured to control operation of a user interface which provides information corresponding to the mapped distribution.

5. The system of claim 4, wherein the system is configured to control operation of the user interface and provide a graphical representation of the mapped distribution.

6. The system of claim 5, wherein the graphical representation comprises a graphical illustration of the sensor data in the form of a two-dimensional map with the categorized sub-regions indicated.

7. The system of claim 6, wherein the sub-regions are highlighted using different colors, shades and/or patterns such that they are visually distinct from other regions in the representation of the mapped distribution.

8. The system of claim 4, wherein the user interface comprises at least one of the following:
    a user interface of the agricultural machine;
    a display on a remote device; and
    a user terminal on at least one further machine operating in the environment.

9. The system of claim 1, wherein the sensing arrangement comprises an image sensor.

10. The system of claim 1, wherein the sensing arrangement comprises a transceiver type sensor.

11. The system of claim 1, comprising or being communicably coupled to a position module operable to provide information relating to a location of an associated agricultural machine within or with respect to the mapped environment.

12. The system of claim 1, including or being communicably coupled to an inertial measurement unit used to determine an orientation of the agricultural machine within the environment.

13. The system of claim 1, comprising a distributed system with at least one component of the system located off-board from the agricultural machine.

14. The system of claim 1, comprising multiple agricultural machines, each comprising at least one sensor for obtaining sensor data, wherein each of the machines is communicable with a central processing unit having the controllers.

15. An agricultural machine comprising the system of claim 1.

16. A method of mapping the distribution of residue material in an environment in which at least one agricultural machine is operable, the method comprising:
    receiving sensor data from at least one sensor of a sensing arrangement mounted or otherwise coupled to the agricultural machine operating within the environment, wherein the sensor data is indicative of the residue material spread by a spreader tool of the agricultural machine;
    determining, from the sensor data, a local distribution of the residue material associated with the spreader tool;
    updating a map of a global distribution of the residue material across the environment based on a local material distribution determined from the sensor data and a location of the agricultural machine,
    wherein updating the map of the global distribution comprises assigning one of a plurality of categories to a sub-region of the environment based on the determined local distribution at a location of the particular sub-region, sub-region, wherein the plurality of categories comprise:
        a region corresponding to unharvested crop;
        a region corresponding to harvested crop and where the residue material has been spread;
        a region corresponding to standing crop and where the material has been spread into as the agricultural machine passed along an adjacent row in the environment; and
        a region corresponding to an area of harvested crop where the residue material has been spread more than once as the agricultural machine passes along an adjacent row in the environment; and
    causing the spreader tool of the agricultural machine to modify a distribution rate of the residue material when the agricultural machine travels through areas of the environment corresponding to the sub-regions where residue material has previously been spread.

17. A system for mapping the distribution of residue material in an environment in which at least one agricultural machine is operable, the system comprising:
    a sensing arrangement comprising at least one sensor mounted or otherwise coupled to the agricultural machine operating within the environment; and
    at least one controller, configured to:
        receive sensor data from the sensors indicative of the residue material spread by a spreader tool of the agricultural machine;
        determine, from the sensor data, a local distribution of the residue material associated with the spreader tool; and
        update a map of a global distribution of the residue material across the environment based on the local material distribution determined from the sensor data and a location of the agricultural machine,
        wherein updating the map comprises: categorizing at least one sub-regions within the environment based on the determined local distribution to one of a plurality of categories comprising:
            a region corresponding to unharvested crop;
            a region corresponding to harvested crop and where the residue material has been spread;
            a region corresponding to standing crop and where the material has been spread into as the agricultural machine passed along an adjacent row in the environment; and
            a region corresponding to an area of harvested crop where the residue material has been spread more than once as the agricultural machine passes along an adjacent row in the environment; and
        cause the spreader tool of the agricultural machine to modify a distribution rate of the residue material when the agricultural machine travels through areas of the environment corresponding to the sub-regions where residue material has previously been spread.

* * * * *